(12) United States Patent
Diamond

(10) Patent No.: US 9,920,895 B2
(45) Date of Patent: Mar. 20, 2018

(54) STREET LIGHT

(71) Applicant: Peter James Andrew Diamond, Hampshire (GB)

(72) Inventor: Peter James Andrew Diamond, Hampshire (GB)

(*) Notice: Subject to any disclaimer, the term of this patent is extended or adjusted under 35 U.S.C. 154(b) by 23 days.

(21) Appl. No.: 14/771,812

(22) PCT Filed: Feb. 24, 2014

(86) PCT No.: PCT/GB2014/050543
§ 371 (c)(1),
(2) Date: Sep. 1, 2015

(87) PCT Pub. No.: WO2014/132043
PCT Pub. Date: Sep. 4, 2014

(65) Prior Publication Data
US 2016/0018074 A1    Jan. 21, 2016

(30) Foreign Application Priority Data
Mar. 1, 2013 (GB) .................................. 1303859.1

(51) Int. Cl.
*F21S 9/03* (2006.01)
*F21S 8/08* (2006.01)
(Continued)

(52) U.S. Cl.
CPC ................. *F21S 8/085* (2013.01); *F21S 9/02* (2013.01); *F21S 9/026* (2013.01); *F21S 9/035* (2013.01);
(Continued)

(58) Field of Classification Search
CPC .. F21S 8/088; F21S 8/085; F21S 9/03; F21W 2131/103; F21V 23/0464
(Continued)

(56) References Cited

U.S. PATENT DOCUMENTS

| 7,976,180 B1 | 7/2011 | Haun | |
|---|---|---|---|
| 2009/0040750 A1* | 2/2009 | Myer | F21S 8/083 362/183 |

(Continued)

FOREIGN PATENT DOCUMENTS

| GB | EP2312090 | 4/2011 |
|---|---|---|
| HK | GB2315123 | 1/1998 |

(Continued)

*Primary Examiner* — Julie Bannan
(74) *Attorney, Agent, or Firm* — Bay State IP, LLC

(57) ABSTRACT

A street light has a hollow standard having a lower end and an upper end. The standard is root mounted at its lower end and supports a lamp and a solar panel. An illumination circuit is mounted in the base compartment and connects a battery to the lamp for control of the lamp. A charging circuit connects the battery to the solar panel and to an electricity connection for charging. A control circuit inside the base compartment controls the brightness. The electricity connection extends from the root portion of the standard for connection of the light to an AC electricity supply. The charging circuit is programmed to connect the battery to the electricity supply at low electricity tariff times and to disconnect the battery from the mains before high electricity tariff times. The charging circuit is programmed to connect the battery to the solar panel for charging during daylight.

26 Claims, 2 Drawing Sheets

(51) Int. Cl.
  *F21S 9/02* (2006.01)
  *F21V 23/04* (2006.01)
  *H05B 37/02* (2006.01)
  *F21V 23/02* (2006.01)
  *F21W 131/103* (2006.01)

(52) U.S. Cl.
  CPC ........ *F21V 23/023* (2013.01); *F21V 23/0464* (2013.01); *F21V 23/0471* (2013.01); *H05B 37/0227* (2013.01); *F21W 2131/103* (2013.01); *Y02B 20/72* (2013.01)

(58) Field of Classification Search
  USPC .................................................. 362/183, 431
  See application file for complete search history.

(56) References Cited

U.S. PATENT DOCUMENTS

| | | | |
|---|---|---|---|
| 2010/0220467 A1* | 9/2010 | Daidone | F21S 8/086 362/183 |
| 2011/0018448 A1 | 1/2011 | Metchear, III | |
| 2011/0316471 A1* | 12/2011 | Yang | H01M 10/482 320/101 |
| 2012/0143383 A1* | 6/2012 | Cooperrider | H04Q 9/00 700/295 |
| 2013/0234605 A1* | 9/2013 | Burrows | H05B 33/0803 315/158 |

FOREIGN PATENT DOCUMENTS

| | | |
|---|---|---|
| JP | EP1431653 | 6/2004 |
| WO | WO2011/098906 | 8/2011 |
| WO | WO2012/064906 | 5/2012 |

\* cited by examiner

STREET LIGHT

CROSS REFERENCE TO RELATED APPLICATION

This application is for entry into the U.S. National Phase under §371 for International Application No. PCT/GB2014/050543 having an international filing date of Feb. 24, 2014, and from which priority is claimed under all applicable sections of Title 35 of the United States Code including, but not limited to, Sections 120, 363, and 365(c), and which in turn claims priority under 35 USC 119 to United Kingdom Application No. 1303859.1 filed on Mar. 1, 2013.

The present invention relates to a street light.

As used herein the term "street light" means not only a light for lighting a street, but also a light for any public space or road.

Local authorities in the UK are charged for electricity used by street light on the UMSUG basis. UMSUG stands for Un-Metered Supply User Group. An authority declares the wattage and usage for each street light and is billed accordingly. No meters are involved. Recently local authorities have been turning off lights for certain periods to save expenditure. However, this does not save as much as might be hoped for, since usage during hours of peak usage of electricity remains high. Further electricity suppliers can be expected to continue to charge more for peak usage times as opposed to low usage times. It is known that similar un-metered systems and charging arrangements are also used outside the UK, in regions such as in Continental Europe and the US.

The street lights of the present invention are intended to be connected to a mains electricity grid at low usage times only, to take advantage of the low tariff charged by energy suppliers at this time. We call our system for utilising the low tariff energy at low usage times a Small-Hours-Energy-Replacement-System or "SHERS".

In our European Patent Application No. 10009532.2, hereafter referred to as "Our Earlier Application", we describe a street light powered by a turbine. The street light has a standard for supporting a lamp with a turbine at the lamp end and a battery at the other end. The standard is pivotally connected to a base about which it can be rotated to lower the light and turbine for servicing. The gravitational moment of the light and the turbine in the lowered position is partially counterbalanced by that of the battery for ease of raising and lowering the lamp and turbine.

"Green" electricity generated from wind and tide is generated when the wind blows and when the tide flows. If this is at low usage times, the electricity cannot always be used efficiently.

LED street lights are known. The present invention is separate from developments in LED technology and is intended to be compatible with future advancements in the field.

The object of the present invention is to provide a street light able to be powered from low tariff electricity.

According to the invention there is provided a street light comprising:
  a lamp standard,
  a direct current powered lamp mounted on the lamp standard,
  a battery installable with the lamp standard for powering the lamp,
  means for connection of the lamp standard to a mains electricity grid,
  a rectifier for charging the battery from the mains electricity grid and
  means for controlling illumination of the lamp and charging of the battery.

Whilst it is conceivable that the lamp could be an alternating current—AC—lamp, powered from the battery via an inverter, preferably it is a direct current—DC—lamp such as a light emitting diode—LED—lamp or an array thereof.

Normally the battery will be a conventional lead acid battery. However other batteries can be used. We can envisage the battery to be housed in a separate weatherproof enclosure, but we prefer for it, and the other circuitry, to be housed on the lamp standard itself.

The means for controlling illumination can be a simple timing circuit for switching the lamp on at a specific time and off again at another. Equally it can be a daylight sensor for the lamp. So far as the charging of the battery is concerned, its control means can be simple time switch set to charge the battery for a set time, which will normally be a low usage/low tariff time. Alternatively either or both of the illumination and the charging can be controlled remotely, i.e. via a Central Management System, in which case the control means in the lamp standard will be slave circuitry. The control circuitry can also include means for controlling the level of illumination between high intensity during periods when more people are expected to require the illumination and low intensity when fewer people are expected. Further the control circuitry can include means for increasing the level of illumination in response to presence of users.

In one embodiment, a solar panel and/or a wind turbine is included for charging of the battery, with a second battery preferably being provided. The charging controller is arranged to interchange battery use and charging on a daily basis and is preferably adapted for:
  the one of the batteries used during the previous night to be solar and/or wind charged during the following day;
  the other battery to be used during the following night, with the one battery being charged from its solar and/or wind charged state to full charge from the mains during the night's low tariff period; and
  vice versa.

To help understanding of the invention, a specific embodiment thereof will now be described by way of example and with reference to the accompanying drawings, in which.

Figure 1:
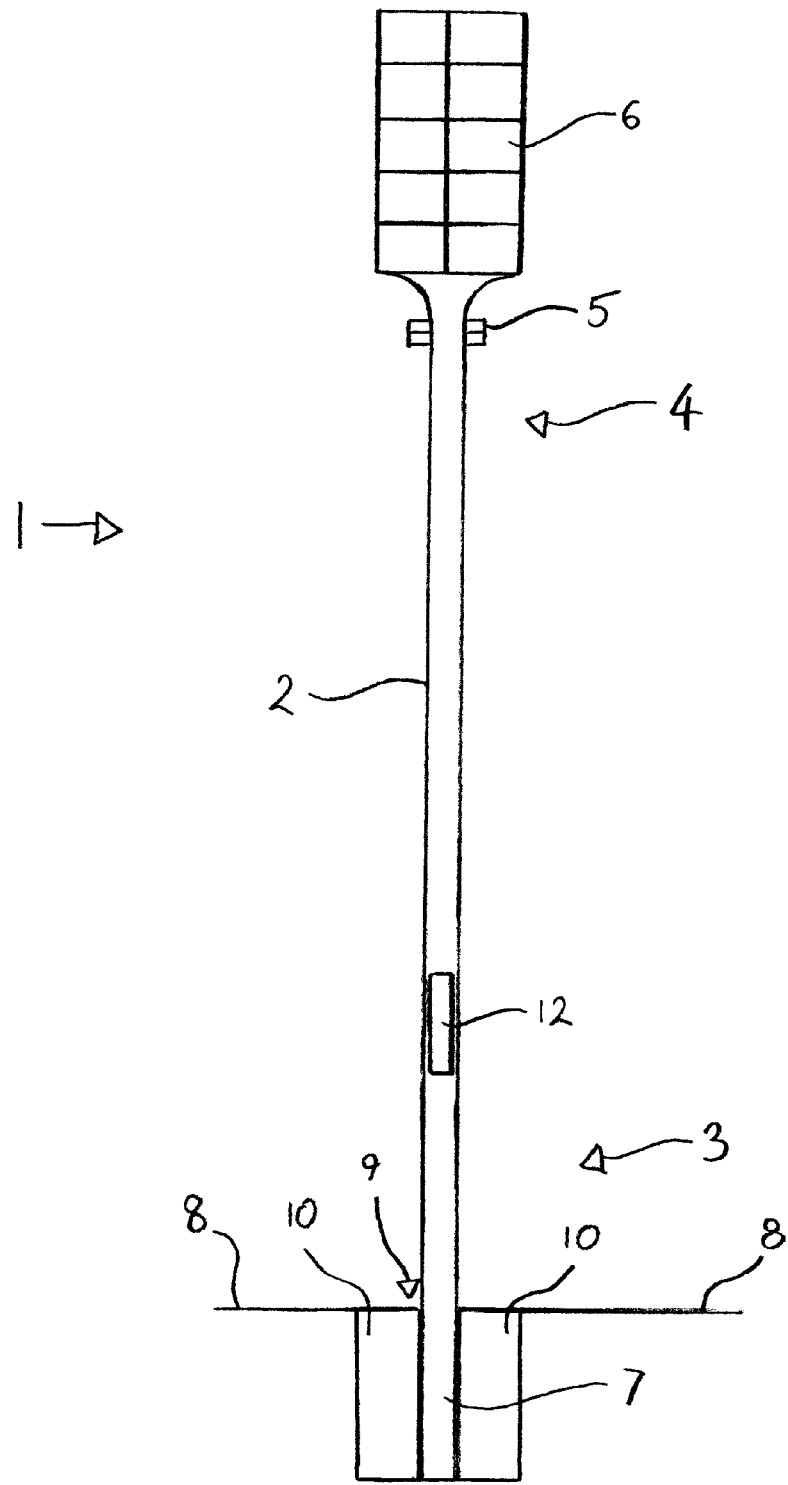
FIG. 1 is a frontal view of a street light of the present invention.
Figure 2:
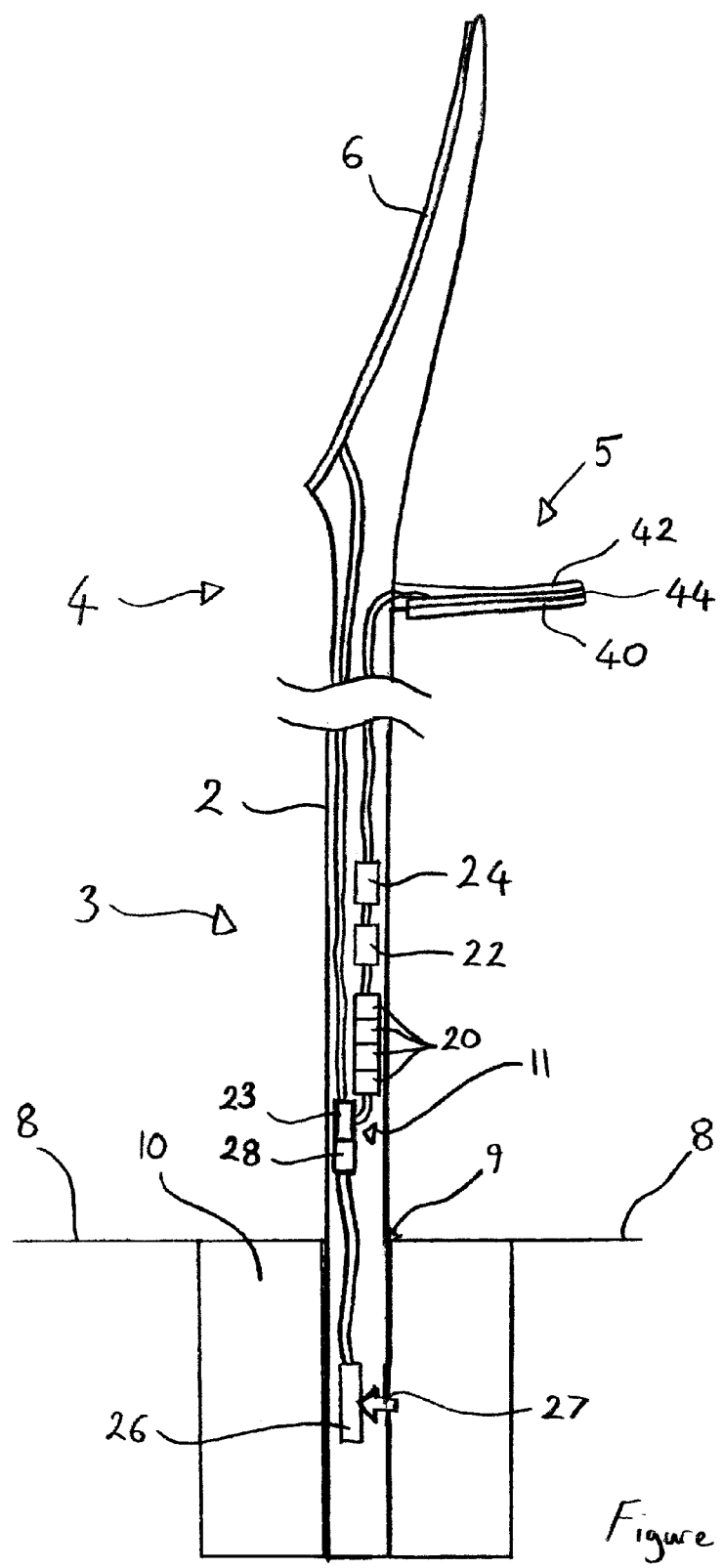
FIG. 2 is a cross-sectional side view of the street light of FIG. 1.

Referring to the drawings, a street light 1 has a hollow standard 2 having a lower end 3 and an upper end 4. The standard 2 is root mounted at its lower end 3 and supports a lamp 5 and a solar panel 6 at its upper end 4.

The standard 2 has a root portion 7, typically 800 mm, which extends below ground level 8, into a hole 9, whereby it is secured in place by a concrete plug 10. The standard 2 extends above ground level 8, typically to a height of 5000 mm, whereby the lamp 5 extends radially outward from the standard over the ground to be illuminated. The solar panel 6 extends upwards from the upper end 3 of the standard 2 and is oriented in a direction to receive sunlight. A base compartment 11 is formed towards the lower end 3 of the standard 2, typically 1200 mm above ground level 8. The base compartment 11 has a door 12 which is accessible by a user from ground level 8 and can be locked closed.

A battery 20, typically a stack of batteries, is housed in the base compartment 11. A lamp illumination circuit 22 is mounted in the base compartment 11 and connects the battery 20 to the lamp 5 for control of switching on/off of the lamp. A charging circuit 23 is mounted in the base compartment 11 and connects the battery 20 to both the solar panel 6 and to a mains electricity connection 26 for charging of the battery. A control circuit 24 is mounted inside the base compartment 11, between the illumination control circuit 22 and the lamp 5 for control of the brightness of the lamp.

The lamp illumination control circuit 22 is typically programmed to switch the lamp on before sunset and to switch the lamp off after sunrise so that the street light is illuminated throughout twilight and the night. The lamp illumination control circuit is further adapted to adjust the on/off time incrementally in accordance with the changing times of sunrise and sunset.

The mains electricity connection 26 extends from the root portion 7 of the standard 2 for connection of the street light 1 to an AC mains electricity supply 27. The charging circuit 23 includes a rectifier 28 between the connection 26 and the battery 20 for the conversion of the AC mains electricity supply 27 to a DC supply suitable for charging of the battery.

The charging circuit 23 is programmed to connect the battery 20 to the mains electricity supply 27 at low electricity tariff times and to disconnect the battery from the mains before high electricity tariff times. Typical high tariff times are around breakfast time in the morning and around tea time in the evening and low tariff times are in the early hours of the morning between 23:00 hrs the previous day and 6:00 hrs in the morning. The charging circuit 23 is also programmed to connect the battery 20 to the solar panel 6 for charging during daylight hours.

The charging circuit 23 is adapted to monitor the state of charge of the battery 20, by monitoring the battery voltage across the terminals, and to connect the battery to the mains supply for charging if the voltage drops below a certain threshold level, in order to prevent damage to the battery.

The charging circuit 23 is further programmed to take account of the variation in the number of daylight hours that the solar panel will receive throughout the year. For this, it is programmed to periodically:
  determine the present state of charge of the battery;
  determine an estimated number of hours of illumination of the lamp for a given night;
  determine an estimated number of hours of daylight the solar panel will receive the following day; and
  connect the battery to the mains supply only when:
    the state of charge of the battery is not sufficient to illuminate the lamp for the remaining estimated number of hours of illumination for the given night or
    the estimated number of hours of daylight the solar panel will receive the following day is not sufficient for the solar panel to charge the battery for illumination of the light the following night.

Therefore between spring and autumn in the UK, when the number of daylight hours is at its highest, the battery may not normally need to be connected to the mains for charging at all.

The control circuit 24 is programmed to control the lamp brightness by varying the intensity of the LEDs 40 via Pulse-Width Modulation (PWM). Various modes of operation of the lamp can be programmed, the intensity of the brightness varying with time or, if a light sensor is provided, with the ambient light levels. Typically a high brightness setting is required at times of high densities of traffic or pedestrians in the vicinity of the light 1 and a low brightness setting is required at times of low densities of traffic or pedestrians.

The lamp 5 comprises an array of Light Emitting Diodes (LEDs) 40 and their respective drivers 42. Typically the power consumption of the LED array is rated at 11 W and the brightness is equivalent to a conventional 28 W-55 W low pressure sodium discharge lamp. Reflectors 44 are provided in the lamp 5 behind the LEDs to direct light towards the street.

The control circuit 24 is further programmed to switch on and off certain ones of the LEDs to vary the pattern of illumination or as another way to alter the lamp brightness.

The battery 20 typically consists of four 12V, 20 AH lead acid batteries stacked to form a single 80 AH battery. The lamp 5 is powered from the battery 20, via the illumination circuit 22. The battery 20 can power the lamp 5 at full intensity throughout the night; however often the intensity of the light is varied by the control circuit 24 during this time. For example, the intensity may be gradually increased from a low level during the first hour of operation and decreased from full intensity during the penultimate period of operation. In winter in the UK sunset can occur at around 16:00 hrs, whereby the street light may be illuminated for up to 7 or 8 hours before the battery is reconnected to the mains for charging at the next low electricity tariff time, typically at 23:00 hrs.

The street lights of the present invention are adapted to operate under a Small-Hours-Energy-Replacement-System or "SHERS", whereby the street lights only access the mains electricity supply 27 at low tariff times.

For conventional, unmetered street lights, the price of mains electricity consumption is generally calculated as:

number of hours of illumination×power consumption of each light×number of lights×rate for electricity at time of illumination.

These conventional street lights are often illuminated during high tariff times, particularly during winter, and so the rate charged for the mains electricity during the hours of illumination is often the expensive peak rate.

For the street lights of the present invention, the price of mains electricity consumption is calculated as:

number of hours of battery charge×power consumption of each battery charge×number of batteries×rate for electricity at time of charging.

To operate under a SHERS, the street lights of the present invention run off their stored battery power, so they do not draw power from the mains grid during high tariff times, and the batteries are charged at low tariff/off peak times, so the rate charged for the running of the lights is the lower off-peak rate.

The invention is not intended to be restricted to the details of the above described embodiment. For instance, the standard may be root mounted or it may be mounted on a flange plate. Where the standard is root mounted, the standard may have any desired length/height above ground level and it may have any suitable ratio of upper end portion length to root portion length; typically the ratio of upper end portion length to lower end portion length is 8:1. It is envisaged that the standard may be any shape. For example, the standard may be a parallel column, or may be tapered from its lower end to its upper end or alternatively the standard may have a wide base, including the base compartment and supporting a parallel or tapered column. The standard is typically of galvanised, welded steel construction. Alternatively it may be of aluminium, stainless steel, plastics, composite, concrete or timber construction.

The battery and lamp may be of different ratings and powers to those specified. The brightness of the lamp is generally dependent on the height of the standard, the size of the area to be illuminated and the density of traffic in the vicinity of the light. The size of the battery required is largely dependent on the power consumption of the lamp and the required number of hours of illumination. In general, the higher the power consumption of the lamp and higher the number of hours of illumination, the larger the size of the battery; however, the number of hours that the battery is expected to be charged may also be a factor in the size of the battery, whereby a high number low tariff energy times and/or a higher number of daylight hours may decrease the size of the battery that is required.

The lamp may comprise a single LED, or an array thereof, or alternatively the lamp may be a discharge lamp, such as a high or low pressure sodium lamp, or any other suitable lamp.

Where the standard is root mounted, the battery may be housed in the root portion of the standard, below ground level. A waterproof enclosure for the battery may be provided to protect against flooding; however such an enclosure is not essential provided that the contacts of the battery will remain above the normal water level.

The lamp may be retrofitted on conventional lamp standards or on walls, whereby no standard or base is provided. In this case, the battery, timer switches and control circuit may be housed in a single unit, together with the lamp.

The street light may be provided with other generators, such as wind turbines. An inverter may possibly be provided such that surplus power generated by the generator may be fed back into the mains grid via the external connection. Alternatively the lamp may not be provided with a generator.

At low tariff/off-peak times, the lamp may be powered from the rectified mains supply rather than the battery or from the generator where provided. In this case, the lamp will only require powering directly from the battery at high/peak tariff times or at times when the generators are not being driven to generate sufficient power to illuminate the lamp.

The illumination control circuit to turn the lamp on/off may be replaced with a light sensor for switching on the lamp when the ambient light is low and switching off the lamp when the ambient light is bright. The lights may be provided with a motion sensor for detecting the presence of vehicles/people in the vicinity of the light and the control circuits may be adapted to increase the brightness of the lamps on detection of movement and to decrease the brightness of the lamps on detection of no movement.

The street lights may be connected to other street lights in a network, the network of street lights being controllable either individually or in parallel from a Central Management System. The network connection may be wired or wireless, and is typically by radio frequency, the control circuits of each light being provided with a transmitter and receiver.

Where as in the above described embodiment, a solar panel is provided, we adapt the acronym SHERS to S&SHERS, i.e. Solar and Small-Hours-Energy-Replacement-System. With such a system, the battery or sets of batteries may be duplicated. This enables one battery to be charged as much as possible during one day from the solar panel. The other battery having been previously fully charged is then used during the night following the one day. The one battery is then fully charged following solar charging during the night's low tariff period. The next day the other battery is solar charged and so on. For this the charging controller is arranged to interchange battery use and charging on a daily basis. This arrangement avoids the battery being solar charged ending the period of solar charging in an inadequately charged state for the following night's usage. This arrangement avoids the need for the charging circuit to be programmed to take account of the variation in the number of daylight hours that the solar panel will receive throughout the year.

The invention claimed is:

1. A street light comprising:
a lamp standard,
a lamp mounted on the lamp standard,
at least two batteries installable with the lamp standard for powering the lamp,
means for connection of the lamp standard to a mains electricity grid,
a rectifier for charging the batteries from the mains electricity grid,
a solar panel and/or a wind turbine for charging of the batteries and
means for controlling illumination of the lamp and charging of the batteries arranged to interchange battery use and charging on a daily basis for:
the one of the batteries used during the previous night to be solar and/or wind charged during the following day;
the other battery to be used during the following night, with the one battery being charged from its solar and/or wind charged state to full charge from the mains during the night's low tariff period; and
vice versa.

2. A street light according to claim 1, wherein the lamp is an alternating current—AC—lamp and the light includes an inverter via which the lamp can be powered from the battery.

3. A street light according to claim 1, wherein the lamp is a direct current—DC—lamp, or an array thereof.

4. A street light according to claim 1, wherein the battery is a lead acid battery.

5. A street light according to claim 1, including a separate weatherproof enclosure for the battery.

6. A street light according to claim 1, wherein the battery and associated circuitry is housed in or on the lamp standard itself.

7. A street light according to claim 1, wherein the means for controlling illumination is a simple timing circuit for switching the lamp on at a specific time and off again at another.

8. A street light according to claim 1, wherein the means for controlling illumination is a daylight sensor for the lamp.

9. A street light according to claim 1, wherein the means for charging of the battery is a simple time switch set to charge the battery for a set time.

10. A street light according to claim 1, wherein a remote Central Management System is provided for the street light with either or both means for controlling illumination of the lamp and charging of the battery is provided remotely and slave control circuitry being provided in the lamp standard.

11. A street light according to claim 1, wherein the control circuitry includes means for controlling the level of illumination between high intensity during periods when more people are expected to require the illumination and low intensity when fewer people are expected.

12. A street light according to claim 1, including means for increasing the level of illumination in response to presence of users.

13. A street light comprising:
a lamp standard,
a direct current powered lamp mounted on the lamp standard,
at least two batteries installable with the lamp standard for powering the lamp,
means for connection of the lamp standard to a mains electricity grid,
a rectifier for charging the batteries from the mains electricity grid,
a solar panel for charging of the batteries and means for controlling illumination of the lamp and charging of the batteries, the said means being adapted to be controlled to periodically:
  determine the present state of charge of the batteries;
  determine an estimated number of hours of illumination of the lamp for a given night;
  determine an estimated number of hours of daylight the solar panel will receive the following day; and
  connect the batteries to the mains supply only when:
    the state of charge of the batteries is not sufficient to illuminate the lamp for the remaining estimated number of hours of illumination for the given night or
    the estimated number of hours of daylight the solar panel will receive the following day is not sufficient for the solar panel to charge the battery for illumination of the light the following night.

14. A street light according to claim 13, wherein the lamp is an alternating current—AC—lamp and the light includes an inverter via which the lamp can be powered from the battery.

15. A street light according to claim 13, wherein the lamp is a direct current—DC—lamp, preferably a light emitting diode—LED—lamp or an array thereof.

16. A street light according to claim 13 wherein the battery is a lead acid battery.

17. A street light according to claim 13, including a separate weatherproof enclosure for the battery.

18. A street light according to claim 13, wherein the battery and associated circuitry is housed in or on the lamp standard itself.

19. A street light according to claim 13, wherein the means for controlling illumination is a simple timing circuit for switching the lamp on at a specific time and off again at another.

20. A street light according to claim 13, wherein the means for controlling illumination is a daylight sensor for the lamp.

21. A street light according to claim 13, wherein the means for charging of the battery is a simple time switch set to charge the battery for a set time, preferably a low usage/low tariff time.

22. A street light according to claim 13, wherein a remote Central Management System is provided for the street light with either or both means for controlling illumination of the lamp and charging of the battery is provided remotely and slave control circuitry being provided in the lamp standard.

23. A street light according to claim 13, wherein the control circuitry includes means for controlling the level of illumination between high intensity during periods when more people are expected to require the illumination and low intensity when fewer people are expected.

24. A street light according to claim 13, including means for increasing the level of illumination in response to presence of users.

25. A street light according to claim 3, wherein the lamp is a light emitting diode—LED—or an array thereof.

26. A street light according to claim 9, wherein the time switch is set to charge the battery during low tariff/low use periods.

* * * * *